United States Patent
Schümann et al.

(10) Patent No.: US 10,684,223 B2
(45) Date of Patent: Jun. 16, 2020

(54) FOAM ANALYSIS DEVICE

(71) Applicant: SITA Messtechnik GmbH, Dresden (DE)

(72) Inventors: Lars Schümann, Dresden (DE); Ralf Haberland, Dresden (DE)

(73) Assignee: SITA Messtechnik GmbH, Dresden (DE)

( * ) Notice: Subject to any disclaimer, the term of this patent is extended or adjusted under 35 U.S.C. 154(b) by 0 days.

(21) Appl. No.: 16/365,705

(22) Filed: Mar. 27, 2019

(65) Prior Publication Data

US 2019/0302021 A1     Oct. 3, 2019

(30) Foreign Application Priority Data

Mar. 29, 2018  (DE) .................. 10 2018 107 590

(51) Int. Cl.
  *G01N 21/552*  (2014.01)
  *G01N 1/28*    (2006.01)
  *G01N 21/03*   (2006.01)

(52) U.S. Cl.
  CPC ........... *G01N 21/552* (2013.01); *G01N 1/286* (2013.01); *G01N 21/0332* (2013.01); *G01N 2201/0626* (2013.01)

(58) Field of Classification Search
  CPC .... G01N 1/286; G01N 21/51; G01N 21/0332; G01N 21/552; G01N 2201/0626; G01N 2013/025; G01N 2015/0011

(Continued)

(56) References Cited

U.S. PATENT DOCUMENTS 4,579,227 A * 4/1986 Miller ................... B07C 5/3416
                                                    209/526
5,536,935 A * 7/1996 Klotzsch ................ G01N 21/51
                                                    209/582

(Continued)

FOREIGN PATENT DOCUMENTS

DE     10214699 A1   10/2003
EP     2950081 A1    2/2015

(Continued)

OTHER PUBLICATIONS

Krüss GmbH: Product Overview 2018. Hamburg, Jul. 12, 2017. 1-41.—Company Document.

(Continued)

*Primary Examiner* — Hoa Q Pham
(74) *Attorney, Agent, or Firm* — Michael Soderman

(57) ABSTRACT

A device and a method for foam analysis. The device comprises a cylindrical sample container with a transparent wall, at least one illumination device and a camera, which can be moved on a track. The curvature of the web runs parallel to the wall of the container. The illumination device directs a light beam onto the wall of the cylindrical sample container at an angle which deflects the light beam into the sample vessel when liquid is present on the inside of the sample container and causes a total reflection when air or another gas fills the foam pores. The camera and the illumination unit are moved along the path in the circumferential direction of the wall of the sample container such that a region to be examined is illuminated in steps or in a continuous progression and the camera records the totally reflected light in the region.

24 Claims, 5 Drawing Sheets

(58) Field of Classification Search
USPC ... 356/239.4, 239.5, 239.6, 428, 240.1, 338, 356/436, 437; 250/574; 382/142
See application file for complete search history.

(56) References Cited

U.S. PATENT DOCUMENTS

| | | | | |
|---|---|---|---|---|
| 5,542,004 | A * | 7/1996 | Constant | G01N 33/146 |
| | | | | 382/100 |
| 5,597,950 | A * | 1/1997 | Mullen | G01F 23/241 |
| | | | | 73/53.01 |
| 6,226,081 | B1 * | 5/2001 | Fantone | G01F 23/292 |
| | | | | 250/223 B |
| 8,305,570 | B2 * | 11/2012 | Piana | G01N 21/51 |
| | | | | 356/239.6 |
| 2010/0302540 | A1 | 12/2010 | Piana | |
| 2014/0294238 | A1 * | 10/2014 | Kolb | G01N 21/9027 |
| | | | | 382/103 |

FOREIGN PATENT DOCUMENTS

| | | |
|---|---|---|
| JP | S60144639 A | 7/1985 |
| JP | H05196566 A | 8/1993 |
| JP | H09325122 A | 12/1997 |
| JP | 200255099 A | 2/2002 |

OTHER PUBLICATIONS

All-around scientific characterization of foam | DFA100. Mar. 31, 2016, https://www.youtube.com/watch?v=AedypXDYnnc [online]. In: YouTube.

* cited by examiner

FOAM ANALYSIS DEVICE

CROSS REFERENCE TO RELATED APPLICATIONS

This application claims the priority of DE 102018107590.1 filed on 2018 Mar. 29; this application is incorporated by reference herein in its entirety.

BACKGROUND

The subject of the present invention is a device for producing foam and the analysis of its properties together with a method for execution of a foam analysis.

Foams occur in different applications. Apart from foodstuffs (beer foams, fruit juice foams) they are also relevant in the manufacture of cosmetics and for technological applications (e.g. cleaning of parts). For evaluation of foams it is necessary to know the characterising parameters of the foam and its changes over time. In particular, these parameters are the height of the foam, the liquid-foam interface, the sizes and shape of the pores as well as the variation of these characteristics over time.

A series of possibilities for determining these parameters is known from the state of the art.

A sensor for measuring turbidity and the proportion of foam of a washing or rinsing liquid is known from DE 20 022 433 U1. The sensor directs the light of a light-emitting diode on an interface to the medium to be examined. Depending on the liquid adjacent to this interface and its refractive index, the light is diffused into the liquid or back into the sensor body. The amount of back-scattered light allows a statement to be made of the parameters to be determined. The sensor only permits a rough qualitative statement on the foam at the spatially restricted interface.

EP 2 418 315 A2 proposes to use the degree of attenuation of the light passing through an optical conductor which is surrounded by the washing liquid, possibly with a proportion of foam, for measuring the liquid-foam interface or to determine the proportion of foam. Here also, the attenuation of the light is due to the different refractive index at the interface of the optical conductor/medium used for detection. A disadvantage is that the optical conductor must pass directly into the medium here.

WO 2005/003758 A1 proposes to determine the image of foam in a test vessel with an electronic image recording device, e.g. a CCD camera. The foam structure is then evaluated by detecting the pore walls in the image and determining characteristic properties, here the fractal dimension of the pore images. The problem here is that, with many foams which form transparent pore surfaces, the walls of pores which connect to the front walls of the pores at the depth of the foam, are incorrectly recognised by the evaluation electronics as frontal walls. This leads to a falsification of the measurement result.

EP 2 950 081 A1 describes an apparatus for foam analysis. The device has two prismatic components which overlap one another so that they form a common base portion and are so arranged that an incident beam on the entry side of the first prism passes through the base portion to the plane, transparent surface of a pressure vessel with foam. If the light beam encounters a surface area on which the cavity of a foam bubble is in contact, the light is totally reflected. Otherwise, it is deflected into the foam. The totally reflected beam emerges through the exit side of the second prism and is detected by a camera. A disadvantage of this design is that only a limited area of the foam can be examined. Furthermore, the design is complex, due to the complicated integration of the base area of the prisms into the pressure chambers, and is not suitable for a rapid change of sample. Moreover, due to the attachment of prisms, the original measurement vessel geometry is disrupted and thus the foam formation characteristic is changed as compared with the original measurement vessels.

SUMMARY

The present invention relates to a device and a method for foam analysis. The device according to the invention comprises a cylindrical sample container with a transparent wall, at least one illumination device and a camera. The illumination device and the camera can be moved on a track. The curvature of the web runs parallel to the wall of the cylindrical sample container. The illumination device is designed to direct a light beam onto the wall of the cylindrical sample container at an angle which deflects the light beam into the sample vessel when liquid is present on the inside of the sample container and causes a total reflection when air or another gas fills the foam pores. The camera and the illumination unit are moved along the path in the circumferential direction of the wall of the sample container such that a region to be examined is illuminated in steps or in a continuous progression and the camera records the totally reflected light in the region to be examined by a stepwise or continuous movement synchronous with the movement of the illumination unit on the track. A method suitable for determining foam parameters using the device of the invention is disclosed.

DETAILED DESCRIPTION

Consequently, the aim is to propose a design for a foam analysis apparatus which overcomes the disadvantages of the prior art and, in particular, supports the rapid analysis of larger portions of foam.

The invention is not restricted to the embodiments depicted and described, but also comprises all embodiments acting likewise within the meaning of the invention. Further, the invention is not restricted to the specially described combinations of features but can also be defined by any other combinations of all specific features disclosed, insofar as the individual features are not mutually excluded or a specific combination of individual features is not explicitly excluded.

The device in accordance with the invention comprises a cylindrical sample container (sample vessel) to receive the foam to be analysed or the liquid forming the foam, with a transparent wall, at least one illumination device and at least one camera, wherein the at least one camera can be moved on a track, which runs parallel to the curvature of the wall of the cylindrical sample container. The illumination device is so configured that at least one light beam is directed on the wall of the cylindrical sample container at an angle which, when liquid is in contact with the inside of the sample container, causes a deflection of the light beam into the sample vessel and, when there is air or another gas filling the foam pores, causes a total reflection. For this, the camera and illumination device are so installed that the illumination device illuminates an area in the circumferential direction of the wall, more precisely the inside wall, of the sample container in steps or continuously, and the camera registers the totally reflected light in the respective area by a continuous movement on the track in synchronism with the illumination, in steps or continuously.

Preferably, the wall of the cylindrical sample container consists of glass, quartz glass or a similar transparent substance. It is essential that the material of the sample container is not chemically attacked by the liquid or its foam.

Preferably the base of the cylindrical sample container is circular. Other shapes are possible, however (elliptical, square, rectangular, polygonal). The wall of the cylindrical sample container is perpendicular to the base (straight cylinder). The cylindrical sample container is preferably open at the top. In the base area it is closed or secured in a base plate, which closes off the sample container at the bottom.

In one embodiment the base plate includes one or several connections for introducing the liquid to be analysed into, or optionally draining the liquid out of, the sample container. Optionally, one or several connections are possible on the base plate for introducing gas into the sample container, which can be used for foaming the liquid.

Preferably, the connections are arranged on the underside of the base plate in the form of self-closing and self-sealing connections, which, when the base plate is placed on a complimentary mounting, make the gas or liquid-tight connection, and which disconnect when the base plate is separated. Optionally, the liquid-assisted heater or temperature controller can also be attached to the sample vessel by means of such connections.

Furthermore, the base plate can contain a coupling to the drive of a stirring device. The stirring device is preferably magnetically coupled to a drive which is located in the mounting and is designed to move the stirring device in the test vessel to foam the liquid or at least support the foaming. In a further embodiment, electrical contacts are provided on the base plate which can provide energy for driving a motor for a stirrer, which then is located in the base plate. The energy for the electrical heater temperature controller can also be transferred in this way.

Optionally, additional connections for sensors are possible in or on the test vessel, for example for temperature measurement.

Since the described connections interact with corresponding counterparts in the mounting of the base plate, without the necessity of carrying out the laborious closing and opening processes, the sample container can be rapidly changed for another sample container quickly and without complications. This facilitates rapid analysis of samples.

In one embodiment, the exchange of sample containers is automated, for example by means of a suitable robot.

Optionally, a stirrer, which possibly can include a gas supply, is also inserted from the top of the sample container to foam the liquid within the sample container.

As a further option, the foam on the surface can be analysed by means of a device from the prior art, in parallel to the testing with the device according to the invention.

Likewise, a flushing device can optionally be provided to flush the inside of the test vessel after the test liquid has been drained off. This flushing device can consist, for example, of one or several nozzles, which spray the inner wall of the test vessel with a flushing liquid from an opening on the top of the test vessel. Preferably, the flushing liquid can be discharged by means of one of the described connections.

The illumination device preferably consists of light-emitting diodes arranged vertically, one above another. The orientation of the light-emitting diodes in such that the light that they transmit is at an abrasive angle to the wall of the sample container. The angle is chosen with regard to the refractive index of the contents, such that total reflection takes place at the interface of the wall of the sample container with its contents at the respective illuminated location or the light passes into the interior of the sample container. In particular, deflection of the light into the interior of the sample container takes place when liquid or the wall of a foam pore (also consisting of liquid) is present at the illuminated location. If, on the other hand, the interior of a pore (filled with gas or air) is present at the illuminated location, total reflection takes place. The occurrence of total reflection at less than the respective angle of illumination is dependent on the refractive index of the wall of the sample container and the liquid and is known from the applicable laws of physics.

The light deflected by total reflection from the wall of the sample container passes into an image sensing device, preferably a camera, particularly preferably a CCD camera.

Since, due to the total reflection, only light from the pore volume is reflected, while the light from the areas in contact with the liquid is deflected into the interior of the sample vessel, a very sharp image is produced, with good contrast values. In particular, only pore walls are imaged which are directly in contact with the wall of the sample vessel. Thus no falsifying images from pores within the foam can be included in the evaluation. The accuracy of measurement of pore size is thus significantly improved.

In order to be able to examine pore characteristics over a larger area of the wall, the illuminated area can be progressively displaced in a circumferential direction and images of the illuminated area can be produced at each location.

The displacement of the illuminated areas takes place in a first preferred embodiment, in which several arrays of light-emitting diodes, arranged one above another, are used in a vertical array, parallel to a first vertical array. The arrays are aligned on adjacent (where required slightly overlapping) strips of the wall of the sample vessel. The arrays are then interconnected in the array sequence of the recording, so that preferably adjacent, strip-like areas of the wall are illuminated successively.

In a second preferred embodiment, the vertical array of light-emitting diodes, parallel to the wall, is moved in its circumferential direction, wherein the angle at which the light meets the wall remains always constant. Thereby, strips of the wall of the sample vessel adjacent to one another are illuminated successively. Preferably, there is a mechanical guide, in which the vertical array of light-emitting diodes is moved parallel to the wall of the sample vessel. For this purpose, for example, a carriage system on guide rails is suitable, for example with a toothed belt drive.

A third embodiment of the illumination unit only comprises one or a few light sources (preferably LEDs). These are so oriented that a common small dot-like spot illuminates the wall of the test vessel. Preferably this illumination unit can also be moved vertically, so that the image of a vertical strip can be composed from images of the areas illuminated by the spot. The vertical mobility can be realised, for example, by means of a known screw drive. After a strip has been recorded in this way, the illumination unit can also be moved parallel to the wall in its circumferential direction and then a further strip can be recorded by scanning the spot. The procedure that is described here is also possible with one or several vertical LED arrays, with which the LEDs of each array are successively switched on, so that each produces a single spot.

So that the camera continues to receive the light from the area of the critical angle of total reflection, it must be guided to each of these illuminated strips. For this purpose, in a preferred embodiment, the camera must also be arranged displaceably on a carriage system or a similar means, preferably on one or several rails. In this case, the drive is also preferably by means of a toothed belt, or a similar system, which enables precise positioning at predetermined locations. Consequently, there are respective complementary positions of active illumination unit and camera, by means of which the totally reflected light on the wall, when there is a pore interior, can enter the camera. Advantageously, camera and illumination unit can be arranged on one and the same carriage.

The camera is preferably a CCD camera, which preferably has only one CCD line, arranged vertically. Due to an appropriately high pixel resolution and aperture angle, it is possible to scan the whole measurement vessel height. Because of its simultaneous displacement of the illumination unit and camera, in very small steps or continuously, following the wall, a depiction of the foam pores in the test vessel can be built up in strips from the individual images from the CCD camera.

If the camera should have a wider image field in the circumferential direction of the test vessel, overlapping portions of images strips of the wall can be recorded successively. These overlapping portions of the image can be recognised and eliminated by means of suitable software from the prior art, and an overall image of the recorded area can be assembled. This preferably is carried out with computer support.

In a further embodiment, the camera can also travel vertically and has a small aperture angle. Thus only a small area of the wall of the test vessel is recorded. Now, by vertical movement of the camera, the camera can now record the respective illuminated strip on the wall of the sample vessel successively.

If an illumination unit in accordance with the third embodiment (vertically displaceable spot) is used, the vertically displaceable camera must be synchronised with the vertically displaceable illumination unit so that the camera records the currently illuminated spot.

An optional further development of the device in accordance with the invention device specifies that the light reflected from the wall is deflected by means of a mirror into the camera. Preferably, the mirror is positioned at a constant angle to the camera and also maintains this angle during travel of the camera on the track. For this purpose the mirror can preferably be arranged on the same carriage as the camera. This facilitates the joint coordinated movement of mirror and camera. Even more preferably, the mirror, camera and illumination unit are arranged on the same carriage, however, it is possible for the mirror to have a separate carriage, which uses a separate track, or alternatively the same track that the camera uses for its movement. The drive can be similar to that for the illumination unit or the camera.

Advantageously, the depth of the device in accordance with the invention is reduced by use of the camera, since the camera can now be located closer to the wall of the test vessel.

The area of the test vessel wall to be examined using the device in accordance with the invention can be determined by the control system or the length of the available track for the lighting unit and test vessel. Thus, it is feasible for the track to be designed as a closed circular curve, concentric with the cylindrical test vessel. In this case, the whole casing of the test vessel can be recorded. Preferably, however, the measured area is in an angle between 3° and 90°, particularly preferably between 5° and 45° and more particularly preferably between 15° and 30°. The specified angle is measured in a plane perpendicular to the geometric central axis of the test vessel, between the two end points of the travel path (track) of the camera, with the point of passage of the central axis of the test vessel through the specified plane as vertex. The geometric central axis runs in the height direction of the test vessel and in its geometric centre.

The height of the area to be examined is determined by the recording area of the camera or illuminated area of the illumination device. Preferably the area to be examined is so high that the interface between the liquid and the foam, as well as the upper limit of the foam are within the area to be examined. Since this is not mandatory, it can be sufficient for many applications to record only the foam or only the interface liquid/foam. Furthermore, it is preferably possible to record the filling level when filling the measurement vessel with sample to be foamed over the complete vessel height.

For control of both the vertical and horizontal movements of camera, optional mirror and illumination unit, and also the other functions of the device (liquid inflow, stirrer operation, image analysis etc.), it is preferable to use one or several data-processing devices. It is particularly preferable to control the whole device by means of a computer.

Preferably, the apparatus is arranged in a light-tight sealable housing. This advantageously prevents extraneous light falsifying or interfering with a measurement. Preferably, the specification for the foam generation includes parameters such as:

Quantity of liquid and temperature
Stirring parameters: speed, direction of rotation, stirring time, acceleration etc.,
Number of foam generation and break-up cycles
Equipment setup regarding output, evaluation etc.,
also by resetting and input to the data-processing equipment.

The method in accordance with the invention provides that a sample vessel is filled with a liquid whose foam is to be examined. Filling can take place before the vessel is put in the mounting of the apparatus in accordance with the invention or when it is already in this device. In the second case, filling with a predetermined quantity of liquid is also computer-controlled.

Likewise, foam generation also takes place under computer control. This can be done by stirring or by introducing gas, for example by means of a tube or a frit. The two possibilities can be used as alternatives or in common. This procedure is preferably computer-controlled.

Foam analysis can then begin. The following steps also take place under computer control. If not already done, the illumination unit and the camera are brought into complementary start positions. The illumination unit is activated and the first strip is illuminated on the wall of the sample vessel as a simultaneous sequence of spots. The camera records the totally reflected light in this strip. After recording, a further, preferably adjacent, strip of the wall of the sample vessel is illuminated. For this purpose, depending on the embodiment of the illumination unit, it is moved along a track, parallel to the wall of the sample vessel, or a further array of LEDs is activated by the illumination unit, while the preceding array is switched off. The camera position is adjusted on its track and now records an image of the newly illuminated, adjacent strip of the wall of the sample vessel. A mirror, which deflects the totally reflected light from the wall of the sample vessel into the camera can also be moved jointly with the camera. This procedure is repeated, until the whole area of the wall of the sample vessel has been recorded. Advantageously, control of the whole procedure and also the evaluation of the recorded images from the camera as well as assembly of the strip images to form an overall image of the area of the wall of the sample vessel to be examined is carried out by means of an electronic data processing system.

DETAILED DESCRIPTION OF THE PREFERRED EMBODIMENTS

Figure 1:
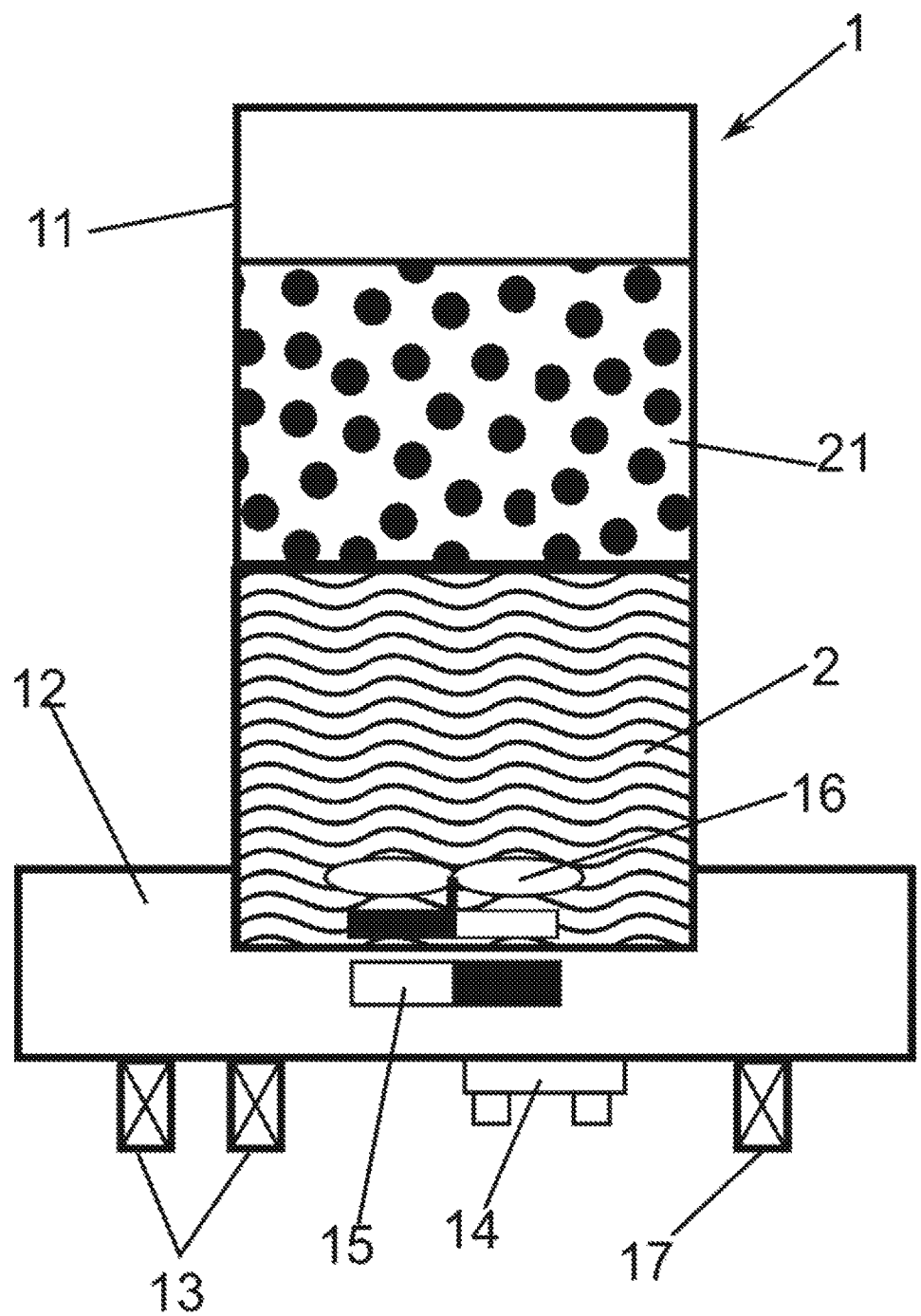
FIG. 1 shows schematically the sample vessel 1 with the liquid 2 and the layer of foam 21 above it.

FIG. 1 shows schematically the sample vessel 1 with the liquid 2 and the layer of foam 21 above it. The sample vessel 1 has a cylindrical wall 11 and is arranged on the base plate 12. This incorporates connections 13 for the inflow and outflow of the liquid 2. Optionally, gas can be introduced into the sample vessel 1 via the inlet 17 for foaming. The magnetic motor 15 can be supplied with current by means of the connections 14. The magnetic motor 15 drives the magnetic stirrer 16 contactlessly, also to foam the liquid 2.

Figure 2:
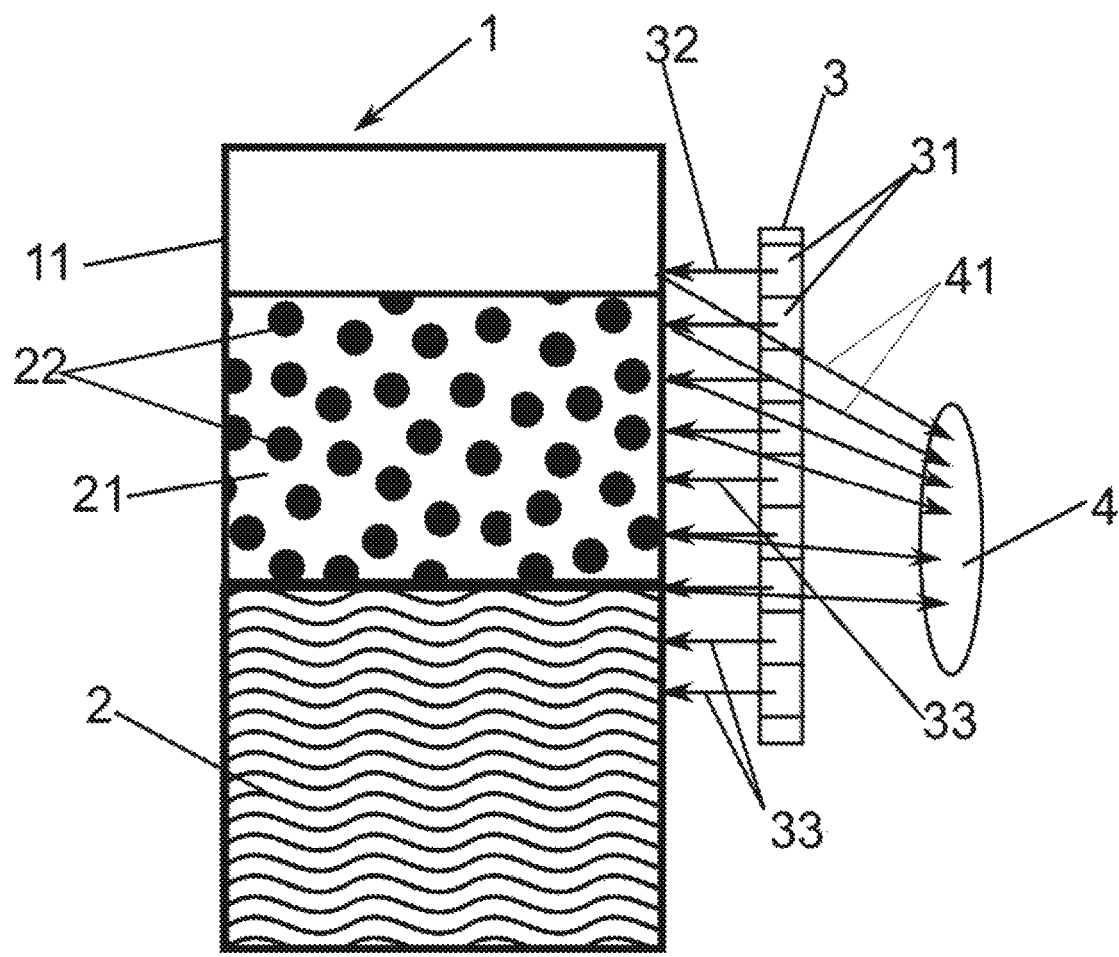
FIG. 2 shows the measurement principle schematically from the side view.

FIG. 2 shows the measurement principle schematically from the side view. The sample vessel 1 contains liquid and foam 21 with pores 22 above it. Light is transmitted to the wall 11 of the sample vessel from the vertical array of LEDs 3 arranged one above the other. The vertical array of light-emitting diodes arranged one above another consists of individual LEDs 31. The LEDs 31 emit light 33, which falls on the wall 11 at locations where liquid is present on the interior of the sample vessel 1. This light 33 is deflected into the interior of the liquid. Light 32 that falls on locations where there is air or gas-filled pores 22 of the foam is totally reflected and passes as light beams 41 to the aperture of the camera 4.

Figure 3:
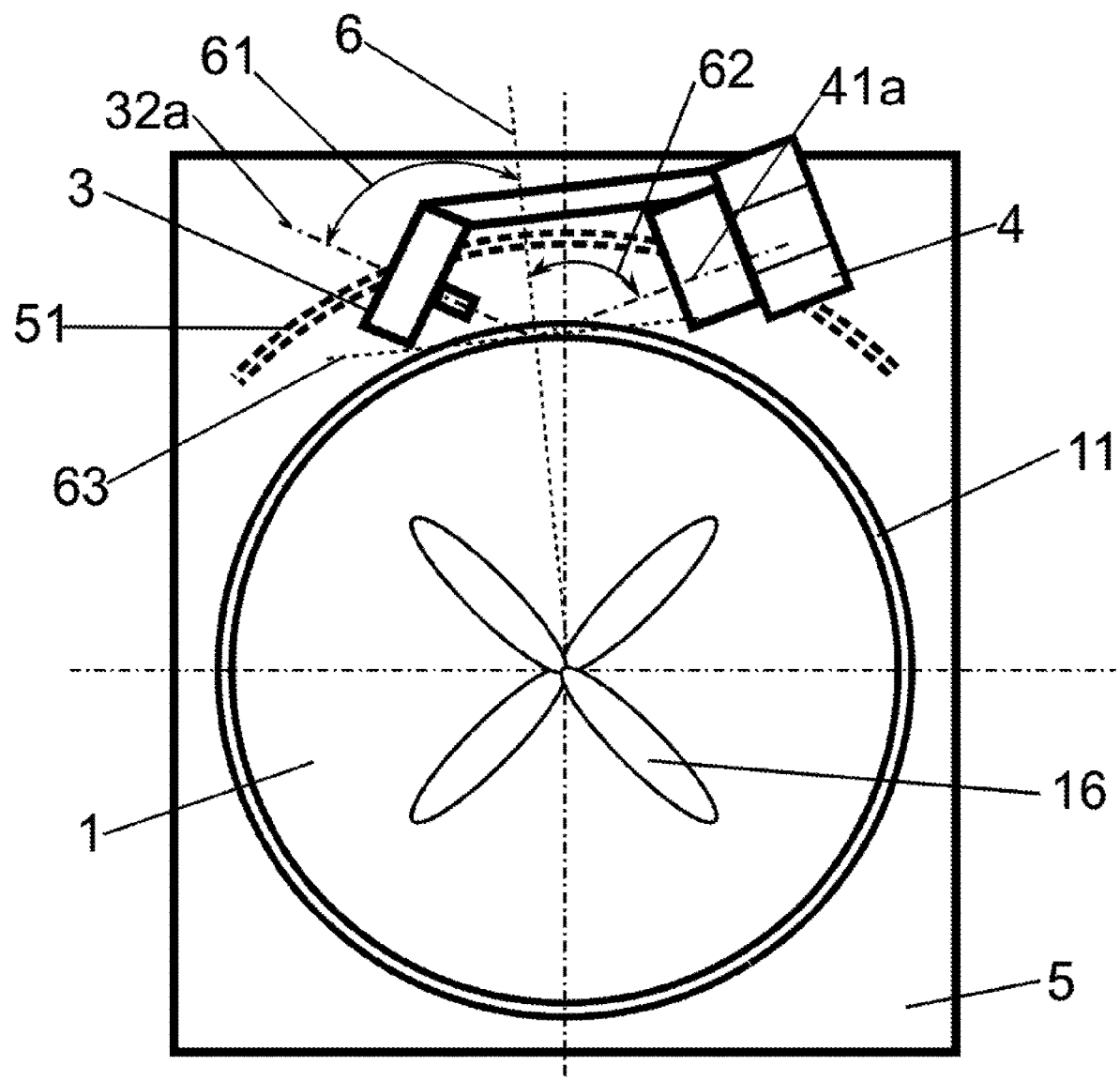
FIG. 3 shows schematically a plan view of the device in accordance with the invention.

FIG. 3 shows schematically a plan view of the device in accordance with the invention. The wall 11 of the sample vessel 1 is illuminated with light from the illumination unit 3. This incident light falls on the wall at an angle alpha 61 to the radius, which runs through the centreline of the strip which is to be observed, on to the wall 11. The tangent 63 to the inner wall thus runs perpendicular to the radius 6. If liquid or the wall of a pore is present at an illuminated location, the incident light (axis of the incident light beam 32a) is scattered into the interior of the sample vessel 1. Otherwise there is total reflection. The totally reflected light (axis of the totally-reflected light beam 41a) is recorded by the camera 4 at an angle beta 62 to the radius, which runs through the centre line of the strip to be observed. The track 51 on the base plate 5 on which the movement of camera 4 and illumination unit 3 takes place parallel to the wall 11 of the sample vessel 1 is indicated schematically.

Figure 4:
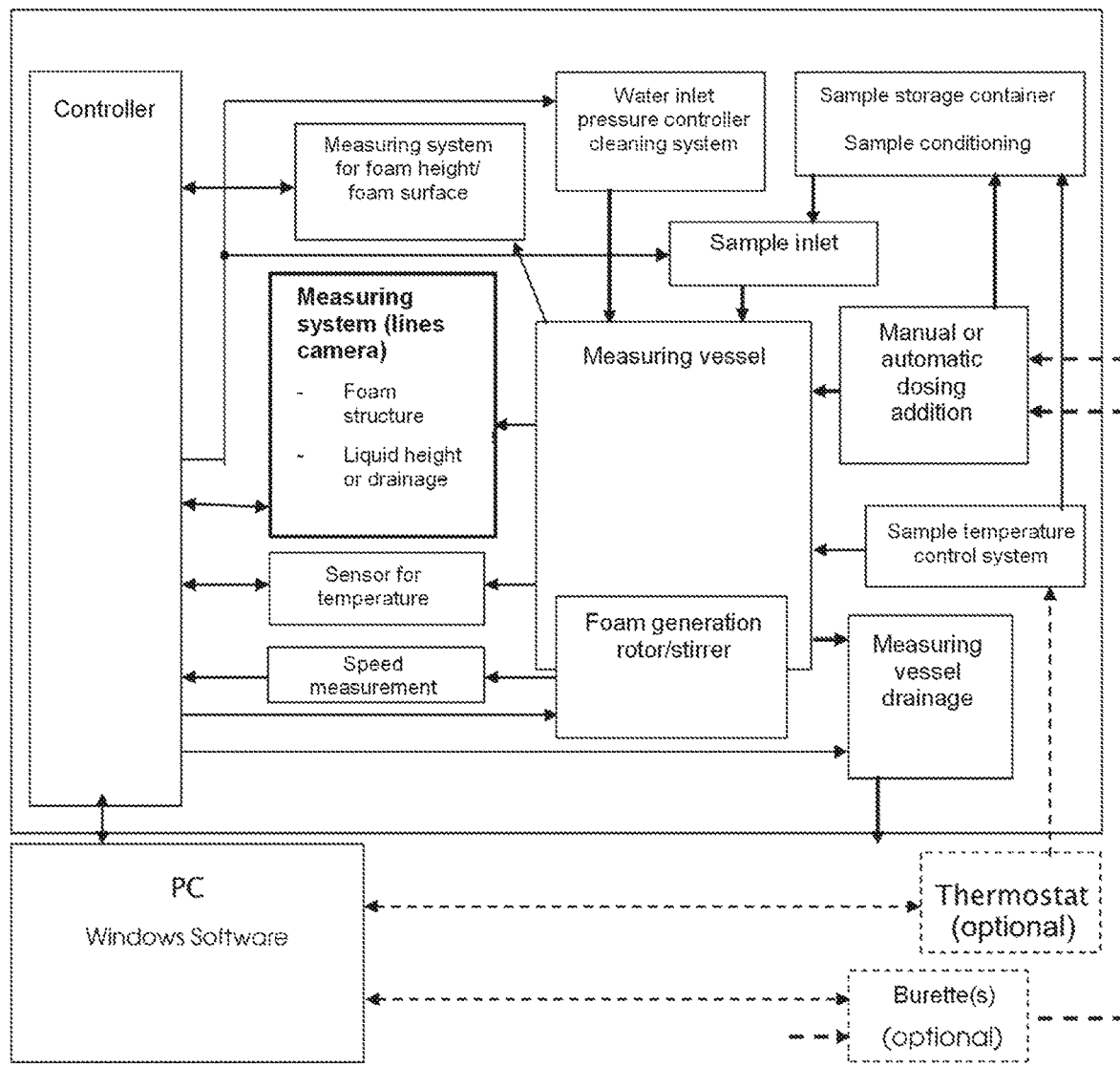
FIG. 4 schematically explains the interaction of the components of the device in accordance with the invention.
Figure 5:
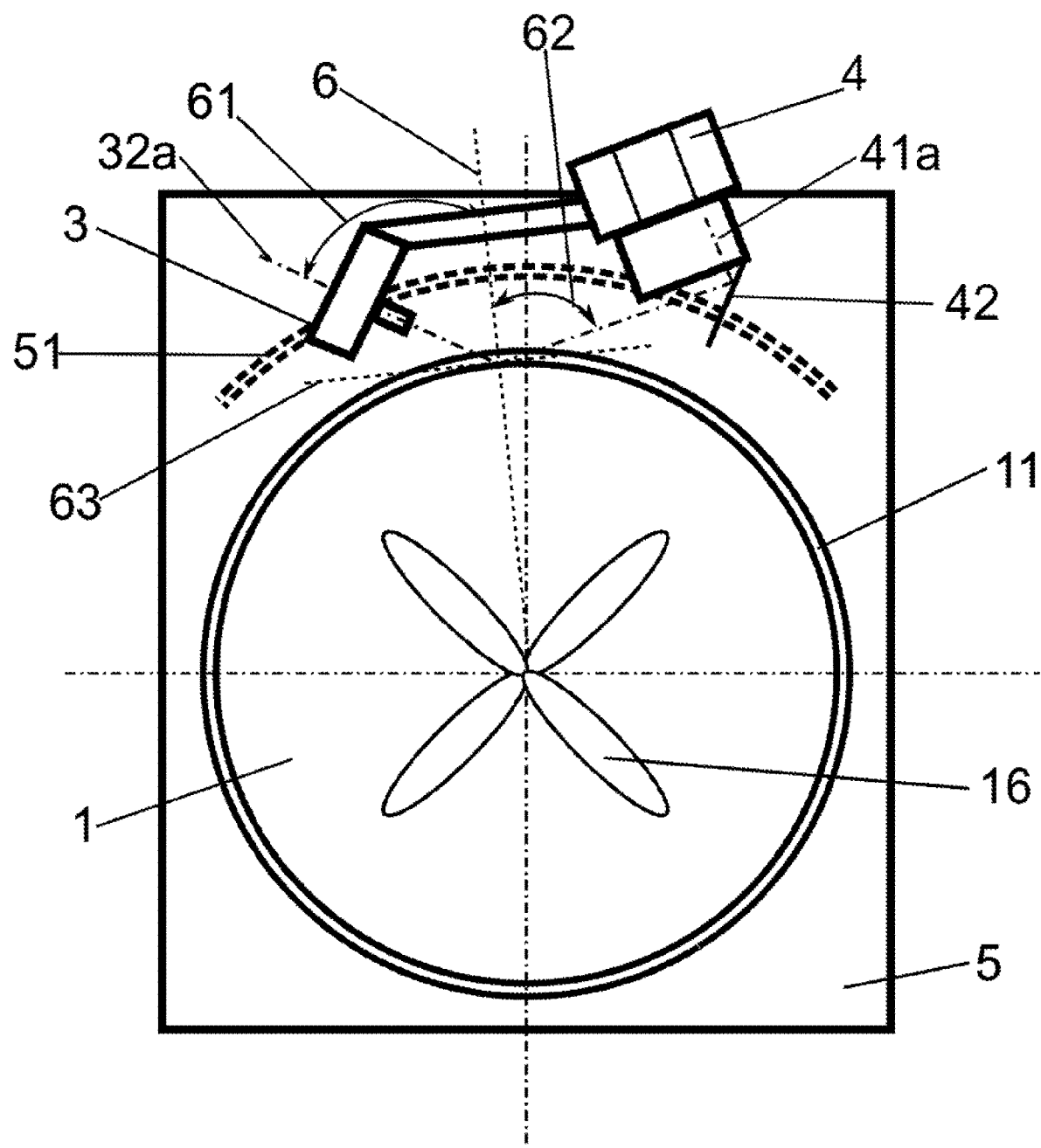
FIG. 5 shows schematically a plan view of the device in accordance with the invention as in FIG. 3 but with the totally reflected light (axis of the totally-reflected light beam 41a) reflected by a mirror 42 into the camera 4.

FIG. 4 schematically explains the interaction of the components of the device in accordance with the invention.

Exemplary Embodiment

The apparatus for foam analysis is integrated into a foam tester, with which fully automatic procedures are carried out. The housing of the foam tester is equipped with doors to exclude extraneous light adequately and not to unduly expose the operator to light from the illumination equipment. Measurements and setting parameters can be read off a display. Furthermore, an analysis and storage unit, a power supply, operating controls as well as an interface for controlling data transmission to a computer are included.

Apart from the foam structure measuring system in accordance with the invention, the foam tester contains supply systems (pumps, valves) for supply and discharge of sample, and cleaning liquid e.g. water, a spray device for cleaning the measurement vessel, a rotor system 16 for foaming the sample in the measuring vessel (sample vessel) 1, a measuring system consisting of camera and projector for scanning the foam surface using structured light, thermostat and stirring (conditioning) devices for the sample store, and sensors for measuring the sample temperature and dosing devices for foam-influencing additives. The sample vessel (measuring vessel) 1 is constructed as a circular cylindrical vessel with an inside diameter of 110 mm and a height of 180 mm. The transparent wall consists of standard commercial glass with a wall thickness of 5 mm.

The foam tester is connected to a standard commercial personal computer, on which a control and evaluation program is installed. This allows the foam tester to be configured more conveniently, measurement sequences to be prepared, and measurement data to be clearly displayed, e.g. in tabular form or as graphs, and also to be stored.

The sample to be measured, here a water-surfactant mixture, is manually poured into the double-wall sample storage container. Alternatively, it can be delivered from a supply line. Where required, the integrated magnetic stirrer in combination with the thermostat connections can condition the sample in the double-walled sample storage container. Since the sample storage container is positioned at a higher level than the measurement vessel 1, the sample runs in to the latter when an inlet valve in the measurement vessel 1 is opened.

The level is constantly monitored with the camera 4 and illumination unit 3 of the apparatus for foam analysis and filling is stopped at the predetermined sample quantity (200 ml). The sample is foamed using the predetermined stirring parameters (2000 rpm, 20 s). Foaming can optionally be intensified by reversing the operation.

The position of the foam surface is detected during foaming (foam formation) by a measuring system for measuring the foam surface. Here a projector/camera measuring system scans the surface at high density and calculates the foam volume under it or transmits the data to the electronic data processing equipment to carry out the calculation.

After the conclusion of foaming (foam breakdown) the measuring system for measuring the foam surface detects the foam surface. The apparatus for foam analysis detects the variation of the altered interface between foam and the liquid and leaching out of the foam, as well as the structure of the foam. The foam structure is described by measurement parameters such as bubble size (geometric extension and direction), bubble shape (sphere, polyhedron) and their variation over time.

The foam tester comprises a base plate 5, on which the sample vessel is also placed. The base plate consists of an aluminium plate. The track 51 in the form of an aluminium rail runs on the aluminium plate, to which it is fastened. Also on the aluminium plate is a toothed belt drive for moving the carriage (not shown), on which illumination unit 3, optional mirror and camera 4 are jointly fastened. The toothed belt is driven by a stepping motor, which is controlled by the computer.

The track 51 is curved in the shape of an arc of a circle, at a constant distance of 150 mm from the wall of the sample vessel 1 over an angle of 90° about the centre of the sample vessel 1. The carriage is also made of aluminium. A camera cradle is arranged on its upper side. The camera cradle holds a CCD camera with a vertically arranged CCD line of the Dragster Line Scan type. The centre of the lens of the camera 4 is positioned at half the height of the measurement vessel 1. In addition, the carriage supports a vertically aligned array 3 of light-emitting diodes. This comprises 42 light-emitting diodes 31, arranged one above another, of the SMD 3528 type. The light-emitting diodes 31 are so oriented that they illuminate the centreline of the strip to be observed on the wall of the sample vessel at an angle alpha=50° to the radius 6. The height of the vertical array 3 of light-emitting diodes 31 is 150 mm from the base of the measurement vessel 1.

The carriage is set in motion under computer control. Movement takes place in angular steps of 0.005° over a total angle of 20°. The total length of the track 51 is not completely utilised for this measurement. After each angular step the carriage is halted, the light-emitting diodes 31 illuminate the strip to be examined and the camera 4 records an image of the totally-reflected light beam. After recording, the images are transmitted to the computer. This produces an overall image of the area to be examined, which covers an angle of 20° at a height of 150 mm. A suitable image processing software analyses the bubble images and produces an appropriate evaluation file.

Further measurement parameters such as temperature or derived variables such as bubble size distributions or foam volume, as well as images of the foam, are determined by the computer, are stored and reported.

Foaming can be repeated, so that several measurement cycles are performed. Optionally, an additive, such as a defoaming agent can be added before or during foaming.

Following conclusion of the measurements, the sample is discharged with a pump. To assist, the measurement vessel 1 is cleaned with water, using the spray device, e.g. in the form of a rotating nozzle.

LIST OF REFERENCE NUMERALS

1 Sample vessel/measurement vessel
11 Cylindrical vessel wall
12 Base plate
13 Connections for liquid inflow and outflow
14 Electric connections
15 Magnetic motor as stirrer drive
16 Stirrer
17 Gas supply
2 Liquid
21 Foam
22 Foam pore
3 Vertical array of light-emitting diodes arranged one above another
31 LED
32 Beam incident on the wall of the test vessel with total reflection
32a Axis of the incident light beam on the wall of the sample vessel
33 Beam incident on the wall of the sample vessel without total reflection
4 Camera
41 Totally-reflected beam
41a Axis of the totally reflected light beam
42 Mirror
5 Base plate
51 Track
6 Radial, which run through the centreline of the strip on the wall of the sample vessel to be observed
61 Angle alpha of the light of the illumination unit to the radial
62 Angle beta to the radials below which the camera receives totally reflected light
63 Tangents to the inside wall of the sample vessel in the centreline of the strip to be observed

The invention claimed is:

1. Device for foam analysis, comprising a cylindrical sample container with a transparent wall, at least one illumination device and at least one camera, which can be moved on a track, which runs parallel to the curvature of the cylindrical sample container, and the illumination device is designed to direct at least one light beam on the wall of the cylindrical sample container at an angle which, when liquid is present on the inside of the sample container, causes a deflection of the light beam in the sample container and, when air is present, or another gas filling the pores, causes a total reflection, characterised in that the camera and illumination unit are so arranged that the illumination unit progressively illuminates an area in the circumferential direction of the wall of the sample container in steps or continuously and the camera records the totally reflected light in the respective area by a movement on the track in steps or continuously, in synchronism with the illumination device.

2. Device in accordance with claim 1, characterised in that the sample container is arranged on a base plate.

3. Device in accordance with claim 2, characterised in that the base plate has one or a number of connections for introducing or discharging the liquid to be analysed and/or gas for foaming the liquid.

4. Device in accordance with claim 3, characterised in that the connections are arranged on the underside of the base plate and are implemented as self-closing and self-sealing connections, which make the gas-tight or liquid-tight connection when the base plate is placed on a complementary mounting and these separate when the base plate is removed from the complementary mounting.

5. Device in accordance with claim 4, characterised in that a liquid-assisted heater or temperature controller is connected by such connections.

6. Device in accordance with claim 2, characterised in that the base plate has electrical connections for electric temperature control of the sample vessel or for sensors in or on the base plate.

7. Device in accordance with claim 1, characterised in that the illumination unit comprises a first vertical array of light-emitting diodes, arranged one above another, which are oriented so that the light emitted from the light-emitting diodes falls at an angle on to the wall of the sample container, so that when there is air or a gas filling the foam pores at the interface of the wall of the sample container to its contents there is a total reflection, or so there is entry of light into the interior of the sample container when there is liquid or the wall of a foam pore at the illuminated location.

8. Device in accordance with claim 7, characterised in that the vertical array of light-emitting diodes, one above another, parallel, to the wall, can move in its circumferential direction, so that adjacent strips of the wall of the sample vessel can be successively illuminated.

9. Device in accordance with claim 7, characterised in that the illumination unit comprises several arrays of light-emitting diodes, arranged one above another, parallel to the first vertical array of light-emitting diodes, arranged one above another.

10. Device in accordance with claim 7, characterised in that the illumination unit consists of one or several LEDs, which are so oriented that a common dot-like spot on the wall of the sample vessel is illuminated, wherein this illumination unit is displaceable horizontally, parallel to the wall of the sample vessel, but is also displaceable vertically, so that the record of a vertical strip can be composed from records of the areas illuminated by the spot.

11. Device in accordance with claim 1, characterised in that the camera is a CCD camera, in which a CCD line is arranged vertically.

12. Device in accordance with claim 11, characterised in that the camera is arranged on a carriage system or a similar device displaceable on one or several rails, wherein a drive comprises a toothed belt or a similar system, which enables a precise positioning at predetermined locations.

13. Device in accordance with claim 11, characterised in that the camera is displaceable vertically and, due to this vertical movement of the camera, the respective illuminated strip on the wall of the sample vessel is successively recorded.

14. Device in accordance with claim 1, characterised in that the light reflected by the wall is deflected into the camera by means of a mirror.

15. Device in accordance with claim 14, characterised in that the mirror is positioned at a constant angle to the camera and also maintains this angle during the displacement of the camera on the track.

16. Device in accordance with claim 1, characterised in that the device further comprises at least one data processing device adapted to control the illumination unit, the camera, the mirror, the connections and, where required, sensors and to store, process and evaluate the results of said sensors and the camera images.

17. Method for foam analysis, characterised in that it includes at least the following steps:
   a. Providing a sample vessel with a liquid to be examined
   b. Providing a device for foam analysis, comprising a cylindrical sample container with a transparent wall, at least one illumination device and at least one camera, which can be moved on a track, which runs parallel to the curvature of the cylindrical sample container, and the illumination device is designed to direct at least one light beam on the wall of the cylindrical sample container at an angle which, when liquid is present on the inside of the sample container, causes a deflection of the light beam in the sample container and, when air is present, or another gas filling the pores, causes a total reflection, wherein the camera and illumination unit are so arranged that the illumination unit progressively illuminates an area in the circumferential direction of the wall of the sample container in steps or continuously and the camera records the totally reflected light in the respective area by a movement on the track in steps or continuously, in synchronism with the illumination device
   c. Foaming the liquid
   d. Illumination of a first strip of the wall of the sample vessel at an angle, so that when air or a gas filling the foam pores is present at the interface of the wall of the sample vessel with its contents, total reflection occurs or the light enters the interior of the sample container when liquid or the wall of a foam pores is present at the illuminated position,
   e. Recording the light totally reflected from the illuminated strip with a camera,
   f. Illumination of a further strip of the wall of the sample vessel at the same angle as in step d.
   g. Moving the camera parallel to the wall of the sample vessel so that the light totally reflected from the illuminated strip is recorded with the camera.

18. Method in accordance with claim 17, characterised in that steps f. and g. are repeated sufficiently often until the area of the wall to be examined by the successive illuminated strips has been completely recorded.

19. Method in accordance with claim 17, characterised in that foaming of the liquid is carried out by stirring and/or by injection of gas or air.

20. Method in accordance with claim 17, characterised in that, for step f., the illumination unit is moved parallel to the wall of the sample container.

21. Method in accordance with claim 20, characterised in that complementary positions are adopted by the illumination unit and the camera so that, at the wall, totally reflected light passes into the camera when a pore interior is present.

22. Method in accordance with claim 17, characterised in that, for step g., the camera is moved parallel to the wall of the sample container.

23. Method in accordance with claim 17, characterised in that the temperature of the liquid is controlled during steps c. to g.

24. Method in accordance with claim 17, characterised in that control of the device and the transmission of control signals to the device and/or the retrieval of camera images and measurements of sensors is carried out by means of a data processing device.

* * * * *